United States Patent
Wang

(10) Patent No.: US 9,769,054 B2
(45) Date of Patent: Sep. 19, 2017

(54) NETWORK TOPOLOGY DISCOVERY METHOD AND SYSTEM

(71) Applicant: ZTE CORPORATION, Shenzhen, Guangdong Province (CN)

(72) Inventor: Qilei Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 25 days.

(21) Appl. No.: 14/890,429

(22) PCT Filed: Apr. 15, 2014

(86) PCT No.: PCT/CN2014/075373
§ 371 (c)(1),
(2) Date: Nov. 11, 2015

(87) PCT Pub. No.: WO2014/183519
PCT Pub. Date: Nov. 20, 2014

(65) Prior Publication Data
US 2016/0087873 A1    Mar. 24, 2016

(30) Foreign Application Priority Data
May 14, 2013   (CN) .......................... 2013 1 0177305

(51) Int. Cl.
*H04L 12/751*  (2013.01)
*H04L 12/24*   (2006.01)

(52) U.S. Cl.
CPC .............. *H04L 45/02* (2013.01); *H04L 41/12* (2013.01)

(58) Field of Classification Search
CPC ................................ H04L 45/02; H04L 41/12
See application file for complete search history.

(56) References Cited

U.S. PATENT DOCUMENTS 9,374,285 B1 *  6/2016  Ramasubramanian . H04L 41/12
2013/0010600 A1 * 1/2013  Jocha .................... H04L 43/026
                                                370/236.2
(Continued)

FOREIGN PATENT DOCUMENTS

CN        101610193 A      12/2009
CN        101656671 A       2/2010
(Continued)

OTHER PUBLICATIONS

XP002701201; Split Architecture for Large Scale Wide Area Networks; SPARC; ICT-258457; Deliverable D3.3.

*Primary Examiner* — Charles C Jiang
*Assistant Examiner* — Thad Defauw
(74) *Attorney, Agent, or Firm* — Ling Wu; Stephen Yang; Ling and Yang Intellectual Property

(57) ABSTRACT

A network topology discovery method and system are disclosed, which relates to the field of software defined network architecture, and solves a problem that greater pressure is easily put on a control channel in a case that a great many switches and ports exist. The method includes: a controller receiving a message sent by a network device, wherein the message carries a device ID of a network device where a link far-end port of the network device is located and a port number of the link far-end port; and the controller performing topology discovery on a network according to the message. The technical scheme provided in the present document is applicable to a software defined network, which achieves that related parameters are carried to the controller via an OpenFlow protocol.

14 Claims, 4 Drawing Sheets

| Version | Type | Length | } Header |
|---|---|---|---|
| Transaction identifier ||| |
| Cause | Padding field || } Cause and Padding field |
| Padding field ||| |
| Port number ||| |
| Padding field ||| |
| Hardware address ||| |
| Hardware address | Padding field || |
| Name ||| |
| Name ||| |
| Name ||| |
| Name ||| |
| Configuration flag ||| } Port description |
| Status flag ||| |
| Existing characteristics ||| |
| Characteristics released by a port ||| |
| Characteristics supported by a port ||| |
| Characteristics of a neighboring node ||| |
| Rate supported by a port ||| |
| Maximum port rate ||| |

(56) References Cited

U.S. PATENT DOCUMENTS

2013/0034104 A1 2/2013 Yedavalli et al.
2014/0241367 A1* 8/2014 Ichino .................... H04L 45/02
　　　　　　　　　　　　　　　　　　　　　　　　370/392

FOREIGN PATENT DOCUMENTS

CN　　　102185706 A　　9/2011
EP　　　　1026916 A1　　8/2000

* cited by examiner

| Version | Type | Length | } Header
|---|---|---|
| Transaction identifier | | |
| Cause | Padding field | } Cause and Padding field
| Padding field | | |
| Port number | | |
| Padding field | | |
| Hardware address | | |
| Hardware address | Padding field | |
| Name | | |
| Name | | |
| Name | | |
| Name | | |
| Configuration flag | | |
| Status flag | | |
| Existing characteristics | | |
| Characteristics released by a port | | |
| Characteristics supported by a port | | |
| Characteristics of a neighboring node | | |
| Rate supported by a port | | |
| Maximum port rate | | |

FIG. 3

| Version | Type | Length | } Header
|---|---|---|
| Transaction identifier ||||
| Cause | Padding field || } Cause and Padding field
| Padding field |||
| Port number |||
| Padding field |||
| Hardware address |||
| Hardware address | Padding field ||
| Name |||
| Name |||
| Name |||
| Name |||
| Configuration flag |||
| Status flag |||
| Existing characteristics |||
| Characteristics released by a port |||
| Characteristics supported by a port |||
| Characteristics of a neighboring node |||
| Rate supported by a port |||
| Maximum port rate |||
| *Node identifier* |||
| *Far-end port number* |||

Port description (rows from Port number through Maximum port rate)

*Extended field* (Node identifier and Far-end port number)

FIG. 4

NETWORK TOPOLOGY DISCOVERY METHOD AND SYSTEM

TECHNICAL FIELD

The present document relates to the field of software defined network architecture, and particularly, to a network topology discovery method and system for performing topology discovery through a protocol in the network.

BACKGROUND OF THE RELATED ART

Since the existing networks exposure more and more disadvantages and people's requirements on the network performance get higher, researchers have to add a great many complicated functions such as Open Shortest Path First (OSPF), a Border Gateway Protocol (BGP), multicast, differentiated services, traffic engineering, Network Address Translation (NAT), firewall and Multi-Protocol Label Switching (MPLS), etc. into architecture of a router. This makes switching devices such as the router more and more bloated and space of performance improvement smaller.

However, it is entirely different from the dilemma of the network field that the computer field achieves a rapid development. Carefully looking back over the development in the computer field, it is not hard to discover that the key is that the computer field finds a simple and available hardware bottom layer (an ×86 instruction set). Due to such a public hardware bottom layer, in aspect of software, both the application program and the operating system have achieved rapid development. Now many people who advocate redesigning the computer network architecture believe that: the network may copy the success of the computer field to solve all the problems encountered in the existing network. Under the guidance of that idea, the future network must be like this: the bottomed data paths (switches and routers) are "mute, simple and minimum", and one open and public Application Programming Interface (API) with respect to a flow table is defined, and the controller is adopted to control the entire network in the meantime. The future researchers can freely call the bottomed API via the controller to perform programming, thereby achieving the network innovation.

Based on the above concept, a Software Defined Network (SDN) appears, and it is originally a new-type network innovation architecture proposed by the clean slate research group of Stanford University. At present, the core technology OpenFlow protocol of the SDN implements a flexible control for network traffics by separating a control plane of the network device from a data plane, which provides a good platform for the innovation of the core network and applications.

An OpenFlow switch includes three parts: a flow table, a security channel and an OpenFlow protocol.

The security channel is an interface for connecting the OpenFlow switch to a controller. The controller controls and manages the switch via the interface, and meanwhile, the controller receives an event from the switch and sends a data package to the switch. The switch and controller perform communication via the security channel, and all the information must be executed according to formats specified in the OpenFlow protocol.

The OpenFlow protocol is used for describing a standard of information used for an interaction between the controller and the switch and an interface standard of the controller and the switch. A core part of the protocol is a set used for information structure of the OpenFlow protocol.

The OpenFlow protocol supports three information types: Controller-to-Switch, Asynchronous and Symmetric, each type has a plurality of subtypes. Controller-to-Switch information is initiated by the controller and directly used for detecting a status of the switch. Asynchronous information is initiated by the switch and normally used for updating network events of the controller and changing the status of the switch. Symmetric information can be initiated by the controller or switch in the condition of no request.

The SDN/OpenFlow is currently at an initial stage of development, the protocol functions are not perfect, and in aspects of discovery of routing topology and uniform control of multiple transport technology networks, certain defects of different degrees are required to be perfected.

At present, two design methods are used for topology discovery in the SDN/OpenFlow scenario.

One is to use an original Link Layer Discovery Protocol (LLDP) protocol to assist the topology discovery, a topology discovery process thereof is: a Controller generating an LLDP packet, and periodically sending the LLDP packet to an OpenFlow switch through a packet-out message, the OpenFlow switch forwarding the LLDP packet to a neighboring switch based on the motion behavior of the Controller, and the neighboring OpenFlow switch sending the LLDP packet to the Controller through a packet-in message, so that the Controller can possess the topology of the entire switched network.

The other one is to use an extended LLDP protocol to perform topology discovery, such LLDP protocol supports the usage of a multicast IP address, when the device receives the LLDP packet, the device not only updates local LLDP information, but also forwards the LLDP packet to other interfaces, so that the Controller and all switches possess the topology of the entire network area.

The above two schemes have the same disadvantage when the network topology discovery is performed, that is, greater pressure is easily put on the control channel in a case that a great many switches and ports exist.

SUMMARY

The present document provides a network topology discovery method and system, which solves a problem that greater pressure is easily put on the control channel in a case that a great many switches and ports exist.

A network topology discovery method comprises:

a controller receiving a message sent by a network device, wherein the message carries a device identifier (ID) of a network device where a link far-end port of the network device is located and a port number of the link far-end port; and the controller performing topology discovery on a network according to the message.

Preferably, the message is a Port-status message of an OpenFlow protocol.

Preferably, an extended field node identifier (node_ID) of the Port-status message represents the device ID of the network device where the link far-end port of the network device is located, and an extended field port number (port_no) represents the port number of the link far-end port.

Preferably, the Port-status message further carries a local node port number of the network device, and the controller performing topology discovery on the network according to the message comprises:

according to an identifier of a neighboring device, the controller determining a connection relation between various network devices;

according to the port number of the link far-end port and the local node port number, the controller determining ports used when connecting between the various network devices; and according to the connection relation between the various network devices and the ports used when connecting between the various network devices, the controller restoring a network image.

Preferably, links between the network devices are unidirectional links or bidirectional links.

Preferably, the controller receiving the message sent by the network device is: the controller receiving the message sent by the network device via a control channel.

The present document further provides a network topology discovery method, which comprises:

a network device sending a message to a controller, wherein the message carries a device ID of a network device where a link far-end port of the network device is located and a port number of the link far-end port.

Preferably, the message is a Port-status message of an OpenFlow protocol.

Preferably, an extended field node_ID of the Port-status message represents the device ID of the network device where the link far-end port of the network device is located, and an extended field port_no represents the port number of the link far-end port.

The present document further provides a network topology discovery system, which comprises: a controller and a plurality of network devices;

the network device is configured to: send a message to the controller, wherein the message carries a device ID of a network device where a link far-end port of the network device is located and a port number of the link far-end port; and the controller is configured to: receive the message, and perform topology discovery on a network according to the message.

Preferably, the message is a Port-status message of an OpenFlow protocol.

Preferably, an extended field node identifier (node_ID) of the Port-status message represents the device ID of the network device where the link far-end port of the network device is located, and an extended field port number (port_no) represents the port number of the link far-end port.

Preferably, the controller being configured to perform topology discovery on the network according to the message is:

according to an identifier of a neighboring device, the controller determining a connection relation between various network devices, and according to the port number of the link far-end port and a local node port number, determining ports used when connecting between the various network devices; and according to the connection relation between the various network devices and the ports used when connecting between the various network devices, restoring a network image.

Preferably, links between the plurality of network devices are unidirectional links or bidirectional links.

The embodiments of the present document provide a network topology discovery method and system, a network device sends a message (specifically a Port-status message) to a controller, wherein the message carries a device ID of a network device where a link far-end port of the network device is located and a port number of the link far-end port, and the controller receives the message sent by the network device, and performs topology discovery on the network according to the message. It is to achieve that related parameters are carried to the controller via an OpenFlow protocol, and the controller can restructure the network topology according to the parameters carried in the OpenFlow protocol, which reduces a data volume in information interaction performed between the controller and the devices in the topology restructuring process, and solves the problem that greater pressure is easily put on the control channel in a case that a great many switches and ports exist.

BRIEF DESCRIPTION OF DRAWINGS

FIG. 3 is the existing Port-status message format.

FIG. 4 is an extended Port-status message format provided in the embodiment 1 of the present document.

PREFERRED EMBODIMENTS OF THE INVENTION

The existing network topology schemes have the same disadvantage when the network topology discovery is performed, that is, greater pressure is easily put on the control channel in a case that a great many switches and ports exist.

In order to solve the above problem, the embodiments of the present document provide a network topology discovery method and system, which can achieve the object of topology discovery by carrying a plurality of essential parameters for the topology discovery through less OpenFlow protocol extension without extending an LLDP, possess an advantage of light weight, and reduce the pressure put by the topology discovery on the control channel.

The embodiments of the present document will be described in detail in combination with the accompanying drawings below. It should be noted that the embodiments in the present document and the characteristics in the embodiments can be optionally combined with each other in the condition of no conflict.

Firstly, the embodiment 1 of the present document will be described in combination with the accompanying drawings.

The embodiment of the present document provides a topology discovery method, which is applicable to network topology discovery in an SDN/OpenFlow scenario. Interconnection information between each OpenFlow network device (specifically a switch) and neighboring nodes is reported to a controller (specifically a Controller) through an OpenFlow protocol, and the Controller collects information reported from each OpenFlow switch, and forms topology information of the entire network after performing rearrangement and combination, to be used for path computation.

Figure 1:
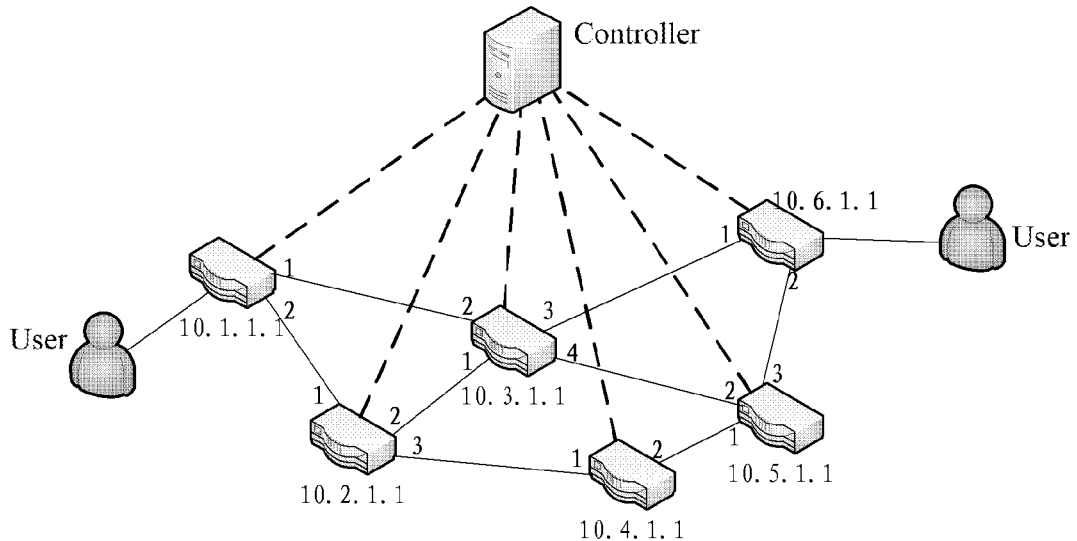
FIG. 1 is a schematic diagram of a physical network topology in an application scenario of the embodiment of the present document.

An application environment of the embodiment of the present document is as shown in FIG. 1, which is a network topology diagram. A solid line indicates a link connection between network devices, each link represents a bidirectional connection (it also can be used for indicating a unidirectional link in certain networks), a dotted line indicates a control channel between the network device and the controller, and an OpenFlow message is transmitted via the control channel between the network device and the controller.

Figure 2:
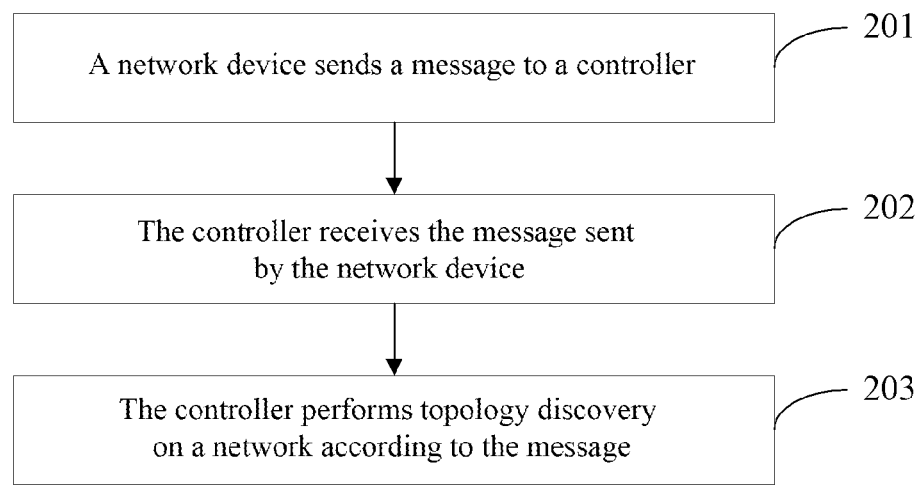
FIG. 2 is a flow chart of a network topology discovery method provided in the embodiment 1 of the present document.

The flow of performing network topology image restoration with the topology discovery method provided in the embodiment of the present document is as shown in FIG. 2, and the following steps are included.

In step 201, a network device sends a message to a controller.

In the step, certain information of neighboring devices is discovered by running an LLDP/LMP protocol between network devices (specifically OpenFlow switches), including node identifier information of the neighboring devices and port identifier information and so on, then link connection information between the local node and other neighboring nodes is reported to the controller through an OpenFlow protocol, wherein the link connection information between the local node and the neighboring nodes is indicated by identifiers of ports at both ends of the links Meanwhile, in order to uniquely identify port information of the links in the network area, it is required to combine the node identifier information and the link identifier information, and both the node identifier information and the link identifier information are reported to the Controller.

Specifically, an OpenFlow switch is required to report a device identifier ID of a network device where a link far-end port of the network device is located and port number information of the link far-end port to a Controller through a Port-status message in an OpenFlow protocol, and the Controller reconstructs a topology image of the entire network according to connection information reported by each node, and then performs path computation, path establishment and label distribution, etc. according to the network topology. Compared with the original scheme of reporting the entire LLDP packet, in the embodiment of the present document, it enables the Controller to obtain the network topology only through a small quantity of extended fields, thus the embodiment of the present document has a characteristic of light weight and has more advantages in implementation and application.

A specific implementation of the Port-status message will be described below.

As described in the background of the related art, the OpenFlow protocol supports three information types: Controller-to-Switch, Asynchronous and Symmetric, each type has a plurality of subtypes. Wherein an Asynchronous message is initiated by the switch and normally used for updating network events of the controller and changing the status of the switch. In the current OpenFlow protocol version, it mainly includes the following four kinds of Asynchronous messages: Packet-in message, Flow-removed message, Port-status message and Error message.

Wherein the Port-status message is used for informing the Controller of a change of the port information, the switch sends the Port-status message to the controller when a port is configured or a port status is changed. Specifically, the existing Port-status message format is as follows:

```
/* A physical port has changed in the datapath */
struct ofp_port_status {
    struct ofp_header header;
    uint8_t reason; /* One of OFPPR_*. */
    uint8_t pad[7]; /* Align to 64-bits. */
    struct ofp_port desc;
};
OFP_ASSERT(sizeof(struct ofp_port_status) == 80);
```

With regard to the above Port-status message format, it may refer to FIG. 3, wherein each line represents 4 bytes (32 bits), and definitions of the rest of fields may refer to the OpenFlow 1.3 protocol version.

The Port-status message is extended in the embodiment of the present document, in the Port-status message, an extended field node identifier (node_ID) is added to represent the device ID of the network device where the link far-end port of the network device is located, and an extended field port number (port_no) is added to represent the port number of the link far-end port.

```
A specific extension scheme is as follows:
/* A physical port has changed in the datapath */
struct ofp_port_status {
    struct ofp_header header;
    uint8_t reason; /* One of OFPPR_*. */
    uint8_t pad[7]; /* Align to 64-bits. */
    struct ofp_port desc;
    uint32_t node_id;          // newly added field, used for identifying a neighboring device ID
    uint32_t port_no_remote;   // newly added field, used for identifying a port number of a link far-end port
};
OFP_ASSERT(sizeof(struct ofp_port_status) == 88);
```

With regard to an extended Port-status message format, it may refer to FIG. 4, wherein each line represents 4 bytes (32 bits).

In the extended fields, node_id (node identifier) is used for indicating an identifier of a neighboring device, and port_no (port number) is used for indicating a port number of a far-end port.

It should be noted that, the scheme provided in the embodiment of the present document can not only be applied to information of physical links directly connected between the network device nodes, but also be applied to logic links indirectly connected, such as Forwarding Adjacency (FA) in a control plane, namely a path crossing a plurality of network device nodes, but it has attributes of one link when seen from a client layer.

In step 202, the controller receives the message sent by the network device.

In the step, by using the extended Port-status message, the Controller can at least obtain field contents of various devices related to the topology, including a local node port number, an opposite-end node identifier and an opposite-end node port number, specifically:

(1) Port-status message of a network device A (identified as 10.1.1.1) includes:
(port_no: 1, node_id: 10.3.1.1, port_no_remote: 2)
(port_no: 2, node_id: 10.2.1.1, port_no_remote: 1)
According to fields in an IP packet of the network device node, it can obtain an identifier of the network device node as: 10.1.1.1.

(2) Port-status message of a network device B (identified as 10.2.1.1) includes:
(port_no: 1, node_id: 10.1.1.1, port_no_remote: 2)
(port_no: 2, node_id: 10.3.1.1, port_no_remote: 1)
(port_no: 3, node_id: 10.4.1.1, port_no_remote: 1)
According to fields in an IP packet of the network device node, it can obtain an identifier of the network device node as: 10.2.1.1.

(3) Port-status message of a network device C (identified as 10.3.1.1) includes:
(port_no: 1, node_id: 10.2.1.1, port_no_remote: 2)
(port_no: 2, node_id: 10.1.1.1, port_no_remote: 1)
(port_no: 3, node_id: 10.6.1.1, port_no_remote: 1)
(port_no: 4, node_id: 10.5.1.1, port_no_remote: 2)

According to fields in an IP packet of the network device node, it can obtain an identifier of the network device node as: 10.3.1.1.

(4) Port-status message of a network device D (identified as 10.4.1.1) includes: (port_no: 1, node_id: 10.2.1.1, port_no_remote: 3) (port_no: 2, node_id: 10.5.1.1, port_no_remote: 1) According to fields in an IP packet of the network device node, it can obtain an identifier of the network device node as: 10.4.1.1.

(5) Port-status message of a network device E (identified as 10.5.1.1) includes: (port_no: 1, node_id: 10.4.1.1, port_no_remote: 2) (port_no: 2, node_id: 10.3.1.1, port_no_remote: 4) (port_no: 3, node_id: 10.6.1.1, port_no_remote: 2) According to fields in an IP packet of the network device node, it can obtain an identifier of the network device node as: 10.5.1.1.

(6) Port-status message of a network device F (identified as 10.6.1.1) includes:

(port_no: 1, node_id: 10.3.1.1, port_no_remote: 3)
(port_no: 2, node_id: 10.5.1.1, port_no_remote: 3)

According to fields in an IP packet of the network device node, it can obtain an identifier of the network device node as: 10.6.1.1.

In step 203, the controller performs topology discovery on a network according to the message.

In the step, after receiving the above Port-status message, the Controller performs topology restructuring, and performs topology discovery on the network, which is specifically as follows:

1. According to an identifier of a neighboring device, the controller determines a connection relation between various network devices;

2. According to the port number of the link far-end port and the local node port number, the controller determines ports used when connecting between the various network devices; and 3. According to the connection relation between the various network devices and the ports used when connecting between the various network devices, the controller restores a network image.

Figure 5:
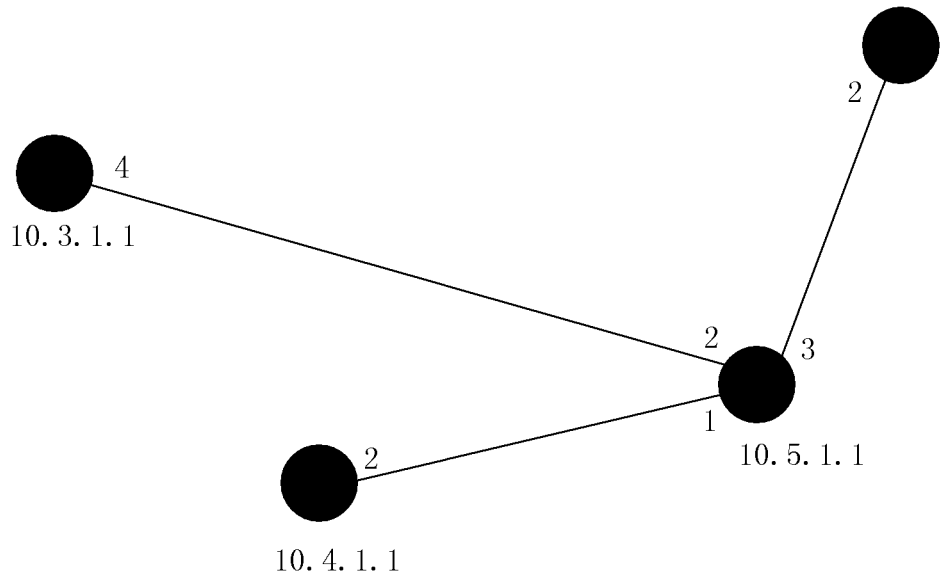
FIG. 5 is a schematic diagram of a topology image of the Controller to the node 10.5.1.1 in the embodiment 1 of the present document.

For example, according to the Port-status message reported from the device 10.5.1.1, it can be obtained that the device 10.5.1.1 is connected to other three devices: 10.4.1.1, 10.3.1.1 and 10.6.1.1 respectively, the corresponding port numbers of the local end are respectively 1, 2 and 3, the far-end port numbers are respectively 2, 4 and 2; thus a topology related to the 10.5.1.1 restored by the Controller is as shown in FIG. 5.

Figure 6:
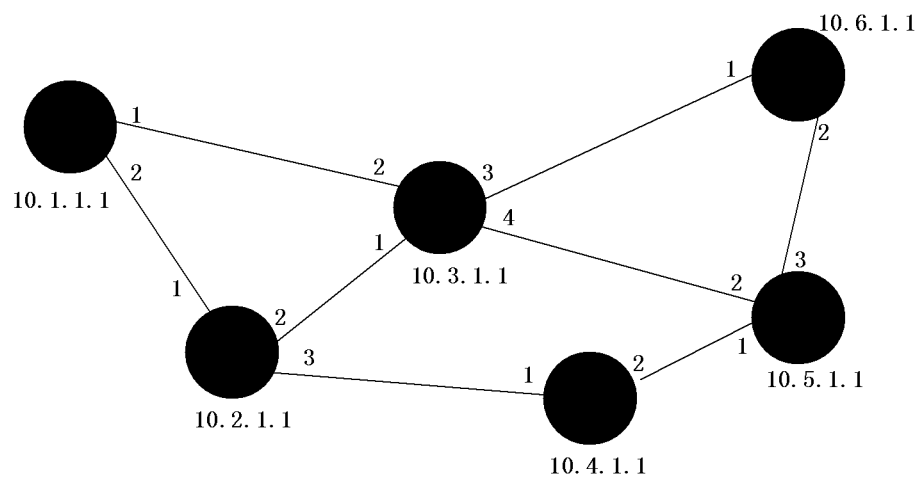
FIG. 6 is a schematic diagram of a topology image of the Controller to the entire network.

After comprehensively analyzing all the Port-status messages reported by the devices, the Controller can restore an image of the entire network, which is specifically as shown in FIG. 6.

The embodiment 2 of the present document will be described below.

The embodiment of the present document provides a network topology discovery system, which includes: a controller and a plurality of network devices;

the network device is used to: send a message to the controller, wherein the message carries a device ID of a network device where a link far-end port of the network device is located and a port number of the link far-end port; and the controller is used to: receive the message, and perform topology discovery on a network according to the message.

Preferably, the message is specifically a Port-status message.

Preferably, an extended field node identifier (node_ID) of the Port-status message represents the device ID of the network device where the link far-end port of the network device is located, and an extended field port number (port_no) represents the port number of the link far-end port.

Preferably, the controller performing topology discovery on the network according to the message is:

according to an identifier of a neighboring device, the controller determining a connection relation between various network devices, according to the port number of the link far-end port and a local node port number, determining ports used when connecting between the various network devices; and according to the connection relation between the various network devices and the ports used when connecting between the various network devices, restoring a network image.

Preferably, links between the plurality of network devices are unidirectional links or bidirectional links.

The ordinary person skilled in the art can understand that all or part of steps of the above embodiments can be implemented by using a flow of computer program, the computer program can be stored in a computer readable memory medium, the computer program is executed on a corresponding hardware platform (such as a system, equipment, device and component and so on), and when the program is carried out, one of the steps or a combination of the steps of the method embodiments is contained.

Alternatively, all or part of the steps of the above embodiments also can be implemented by using integrated circuits, these steps can be made into multiple integrated circuit modules respectively or multiple modules or steps of them can be made into a single integrated circuit module to be implemented. Therefore, the present document is not limited to any combination of hardware and software in a specific form.

The devices or function modules or function units in the above embodiments can be implemented through a universal calculating device, and they can be concentrated on a single calculating device or distributed in a network consisting of multiple calculating devices.

If implemented in a form of software function module and sold or used as an independent product, the devices or function modules or function units in the above embodiments can be stored in a computer readable memory medium. The computer readable memory medium mentioned above can be a read-only memory, disk or optical disk and so on.

Any skilled familiar to the art can easily conceive changes and substitutions within the technical scope disclosed by the present document, and these changes and substitutions shall be all covered within the protection scope of the present document. Therefore, the protection scope of the present document should be subject to the protection scope described in the claims.

INDUSTRIAL APPLICABILITY

The embodiments of the present document provide a network topology discovery method and system, a network device sends a Port-status message to a controller, wherein the Port-status message carries an ID of a neighboring device and a port number of a link far-end port, and the controller receives the Port-status message sent by the network device, and performs topology discovery on the network according to the Port-status message. It is to achieve that related parameters are carried to the controller via an OpenFlow protocol, and the controller can restructure the network topology according to the parameters carried in the OpenFlow protocol, which reduces a data volume in information interaction performed between the controller and the devices in the topology restructuring process, and solves the problem that greater pressure is easily put on the control channel in a case that a great many switches and ports exist.

What is claimed is:

1. A network topology discovery method, comprising:
a controller receiving a message sent by a network device, wherein the message carries a device identifier (ID) of a far-end network device where a link far-end port of the network device is located and a port number of the link far-end port; wherein before the network device sends the message to the controller, the network device discovers the device ID of the far-end network device where the link far-end port of the network device is located and the port number of the link far-end port; and
the controller performing topology discovery on a network according to the message.

2. The network topology discovery method according to claim 1, wherein, the message is a Port-status message of an OpenFlow protocol.

3. The network topology discovery method according to claim 1, wherein, links between the network devices are unidirectional links or bidirectional links.

4. The network topology discovery method according to claim 1, wherein, the controller receiving the message sent by the network device is:
the controller receiving the message sent by the network device via a control channel.

5. The network topology discovery method according to claim 2, wherein, an extended field node identifier (node_ID) of the Port-status message represents the device ID of the far-end network device where the link far-end port of the network device is located, and an extended field port number (port_no) represents the port number of the link far-end port.

6. The network topology discovery method according to claim 5, wherein, the Port-status message further carries a local node port number of the network device, and the controller performing topology discovery on the network according to the message comprises:
according to an identifier of a neighboring device, the controller determining a connection relation between various network devices;
according to the port number of the link far-end port and the local node port number, the controller determining ports used when connecting between the various network devices; and
according to the connection relation between the various network devices and the ports used when connecting between the various network devices, the controller restoring a network image.

7. A network topology discovery method, comprising:
a network device discovering a device identifier (ID) of a far-end network device where a link far-end port of the network device is located and a port number of the link far-end port; and
the network device sending a message to a controller, wherein the message carries the device ID of the far-end network device where the link far-end port of the network device is located and the port number of the link far-end port.

8. The network topology discovery method according to claim 7, wherein, the message is a Port-status message of an OpenFlow protocol.

9. The network topology discovery method according to claim 8, wherein, an extended field node_ID of the Port-status message represents the device ID of the far-end network device where the link far-end port of the network device is located, and an extended field port_no represents the port number of the link far-end port.

10. A network topology discovery system, comprising: a controller and a plurality of network devices;
the network device is configured to: discover a device identifier (ID) of a far-end network device where a link far-end port of the network device is located and a port number of the link far-end port, and send a message to the controller, wherein the message carries the device ID of the far-end network device where the link far-end port of the network device is located and the port number of the link far-end port; and
the controller is configured to: receive the message, and perform topology discovery on a network according to the message.

11. The network topology discovery system according to claim 10, wherein, the message is a Port-status message of an OpenFlow protocol.

12. The network topology discovery system according to claim 10, wherein, links between the plurality of network devices are unidirectional links or bidirectional links.

13. The network topology discovery system according to claim 11, wherein, an extended field node identifier (node_ID) of the Port-status message represents the device ID of the far-end network device where the link far-end port of the network device is located, and an extended field port number (port_no) represents the port number of the link far-end port.

14. The network topology discovery system according to claim 13, wherein, the controller being configured to perform topology discovery on the network according to the message is:
according to an identifier of a neighboring device, the controller determining a connection relation between various network devices, and according to the port number of the link far-end port and a local node port number, determining ports used when connecting between the various network devices; and according to the connection relation between the various network devices and the ports used when connecting between the various network devices, restoring a network image.

* * * * *